UNITED STATES PATENT OFFICE.

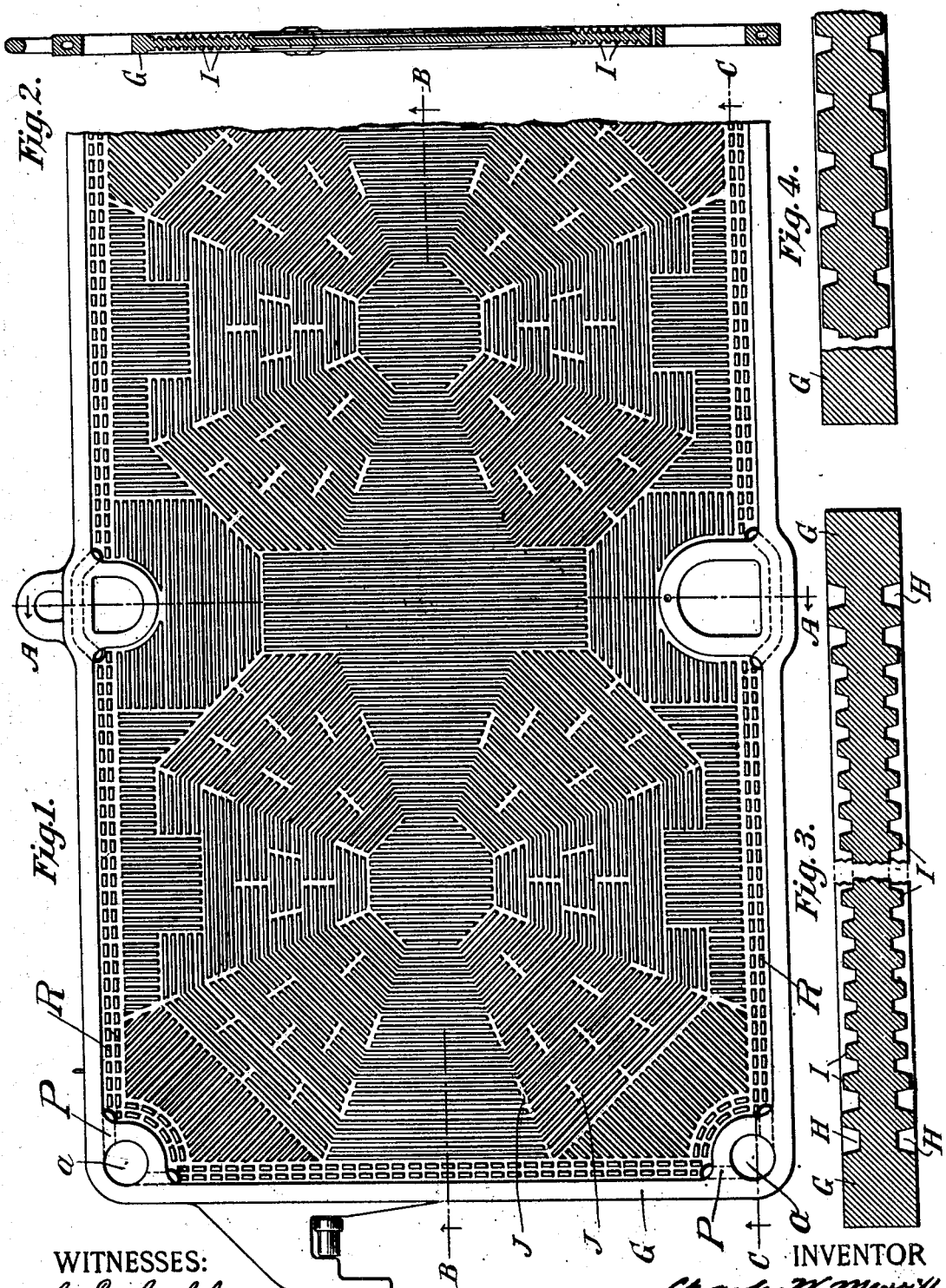

CHARLES W. MERRILL, OF LEAD, SOUTH DAKOTA.

PLATE FOR PRESSURE-FILTERS.

No. 912,867.   Specification of Letters Patent.   Patented Feb. 16, 1909.

Application filed November 23, 1906. Serial No. 344,700.

*To all whom it may concern:*

Be it known that I, CHARLES W. MERRILL, a citizen of the United States, and resident of Lead, county of Lawrence, State of South Dakota, have invented a new and useful Improvement in Plates for Pressure-Filters, of which the following is a specification.

My invention relates to improvements in filter plates for use in connection with pressure filters, and particularly to that class of filter plates the surfaces of which are provided with corrugations or truncated pyramids, which form grooved or bossed drainage surfaces.

The particular object of the invention is so to arrange the corrugations and pyramids that there will be no continuous line of weakness at any one considerable portion of the filter plate, and at the same time to effect complete and continuous drainage from the different drainage surfaces.

The invention will be best understood by reference to the accompanying sheet of drawings, in which—

Figure 1 is a plan view of the filter plate; Fig. 2 is a vertical cross section on the line A—A of Fig. 1 looking in the direction of the arrows; Fig. 3 is a vertical longitudinal section, partly broken away, on the lines B—B of Fig. 1 looking in the direction of the arrows, and Fig. 4 is a similar section on the line C—C of Fig. 1 looking in the direction of the arrows.

Similar letters refer to similar parts throughout the several views.

In the drawings, G represents the filter plate which is of cast iron or other convenient substance.

H represents the inner surface of the filter plate, as distinguished from the machined bearing surface around its exterior, and I represents the corrugations or bosses which form the drainage surfaces. These are flat on top with beveled sides, as shown in Figs. 3 and 4, and they are arranged with reference to each other so as to form parallel corrugations as shown in Fig. 1, which are grouped in such a way that they intersect each other at angles greater than 90°. As a result there are no long lines of weakness in the plate, as is the case in the plate in which truncated pyramids are employed, or the ordinary plate with parallel corrugations only. It is preferable to arrange the corrugations substantially as shown, in two octagonal groups of concentric corrugations connected by transverse channels J, the angles being in each case greater than 90°, but any other grouping which will permit the corrugations to intersect each other at such an angle may be employed. The raised ribs R around the outer periphery of the inner surface of the plate, form a main duct or canal for the collection or distribution of liquid, and are connected by a port or ports P, with a main channel or channels *a* running longitudinally through the press when assembled.

I claim as my invention:

1. A filter plate provided with a solid central web and corrugations thereon broken at convenient points and so aggregated that any straight groove is shorter than the shortest interior surface dimension of said plate.

2. A filter plate provided with a solid central web and corrugations thereon intersecting at an angle of other than ninety degrees and broken at convenient points by grooves each of which is shorter than the shortest interior surface dimension of said plate.

3. A filter plate provided with a solid central web and corrugations thereon so aggregated as to form groups of concentric polygons the sides of which are intersected by drainage grooves each of which is shorter than the shortest interior surface dimension of said plate.

4. A filter plate provided with corrugations thereon so aggregated as to form groups of concentric polygons, the sides of which are intersected by drainage grooves.

5. A filter plate provided with a solid central web and corrugations thereon so aggregated as to form concentric octagons, the sides of which are intersected by drainage grooves, each of which is shorter than the shortest interior surface dimension of said plate.

6. A filter plate provided with a solid central web and corrugations thereon so aggregated as to form polygons, the sides of which are so intersected by grooves as to insure complete drainage, each of which is shorter than the shortest interior surface dimension of said plate.

7. A filter plate provided with a solid central web and parallel corrugations thereon so aggregated as to form concentric polygons, the sides of which are so intersected by grooves as to insure complete drainage, each of which is shorter than the shortest interior surface dimension of said plate.

8. A filter plate provided with a solid central web and parallel corrugations thereon so aggregated as to form concentric octagons, the sides of which are so intersected by grooves as to insure complete drainage, each of which is shorter than the shortest interior surface dimension of said plate.

In testimony, that I claim the foregoing as my invention, I have signed my name in presence of two witnesses, this 16th day of November 1906.

CHARLES W. MERRILL.

Witnesses:
S. MERRILL,
WM. HAMMOND, Jr.